United States Patent
Kang et al.

(10) Patent No.: US 12,050,476 B2
(45) Date of Patent: Jul. 30, 2024

(54) METHOD OF DETERMINING LOCATION FOR SWARM FLIGHT USING UWB

(71) Applicant: RAON Convergence, Co. Ltd., Daejeon (KR)

(72) Inventors: Chan Ku Kang, Sejong-si (KR); Young Gwan Kim, Daejeon (KR)

(73) Assignee: RAON Convergence, Co. Ltd., Daejeon (KR)

( * ) Notice: Subject to any disclaimer, the term of this patent is extended or adjusted under 35 U.S.C. 154(b) by 178 days.

(21) Appl. No.: 17/325,388

(22) Filed: May 20, 2021

(65) Prior Publication Data
US 2022/0375354 A1 Nov. 24, 2022

(30) Foreign Application Priority Data
May 20, 2021 (KR) .................. 10-2021-0064858

(51) Int. Cl.
*G05D 1/00* (2024.01)
*G01S 19/43* (2010.01)
(Continued)

(52) U.S. Cl.
CPC .............. *G05D 1/104* (2013.01); *G01S 19/43* (2013.01); *H04W 84/20* (2013.01); *B64U 2201/102* (2023.01); *H04B 17/318* (2015.01)

(58) Field of Classification Search
CPC ....... G05D 1/104; G01S 19/43; G01S 5/0289; G01S 13/765; H04W 84/20; H04W 84/06;
(Continued)

(56) References Cited

U.S. PATENT DOCUMENTS

| | | | | |
|---|---|---|---|---|
| 10,114,384 B2* | 10/2018 | Liu | ...................... | G08G 5/0069 |
| 2017/0328683 A1* | 11/2017 | Smith | ................... | G01S 5/0072 |
| 2020/0389763 A1* | 12/2020 | Yoon | ..................... | G01S 13/765 |

FOREIGN PATENT DOCUMENTS

| | | | | | |
|---|---|---|---|---|---|
| WO | WO-2019133048 A1 | * | 7/2019 | ........... | H04B 17/318 |
| WO | WO-2021048500 A1 | * | 3/2021 | .............. | G01S 11/12 |

OTHER PUBLICATIONS

Machine Translation WO2021048500 (Year: 2021).*
Shushuai Li "An autonomous swarm of micro flying robots with range-based relative localization" (Year: 2020).*

* cited by examiner

*Primary Examiner* — Anne Marie Antonucci
*Assistant Examiner* — Misa H Nguyen
(74) *Attorney, Agent, or Firm* — United One Law Group LLC; Kongsik Kim; Jhongwoo Peck

(57) ABSTRACT

Proposed is a method of determining a location for swarm flight using UWB, the method including: computing a reference location from GPS information in a case where the location is measured; sending out a pulling signal, preset according to a two-way ranging format, according to slave ranging scheduling corresponding to each formation, and receiving a pushing signal from a neighboring flight vehicle and performing ranging; computing a relative location in the formation on a master-slave basis from a ranged pull-push relationship using TWR time information, and computing the relative location in the formation on a slave-slave basis using a received signal strength indicator and time of arrival; generating a fingerprint map in a manner that varies with each formation, using all the computed relative locations in the formation on the master-slave basis; and computing the location of the swarm flight vehicle using the generated fingerprint map.

5 Claims, 6 Drawing Sheets

(51) Int. Cl.
*H04B 17/318* (2015.01)
*H04W 84/20* (2009.01)
(58) Field of Classification Search
CPC ........ B64U 2201/102; B64U 2201/104; H04B 17/318; B64C 39/024
See application file for complete search history.

※ (UWB)RANGING ⇐ SLAVE SCHEDULING
< SWARM FLIGHT >

FIG. 3
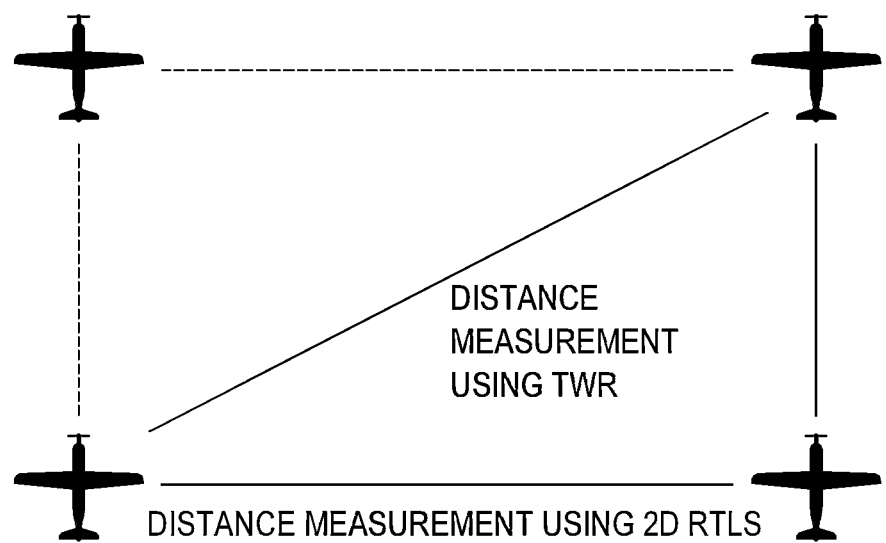
DISTANCE MEASUREMENT USING 2D RTLS
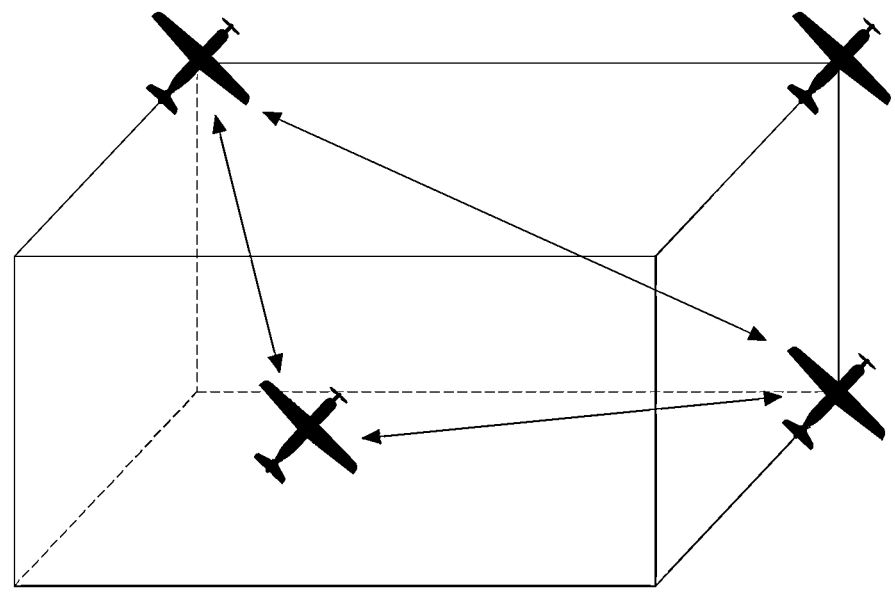
DISTANCE MEASUREMENT USING 3D RTLS

METHOD OF DETERMINING LOCATION FOR SWARM FLIGHT USING UWB

CROSS-REFERENCE TO RELATED APPLICATION

The present application claims priority to Korean Patent Application No. 10-2021-0064858, filed on May 20, 2021, which application is incorporated herein by reference in its entirety.

BACKGROUND

1. Field of the Invention

The present disclosure relates to a method of determining a location for swarm flight and, more particularly, to a technology in which, in a case where swarm flight vehicles fly in order to carry out a specific task, flight of each flight vehicle is controlled with swarm flight information and thus is capable of swarm flight.

2. Description of the Related Art

Unless otherwise described throughout the present specification, all matters described in this section are not prior art against the claims in this application, and the inclusion in this section does not constitute an admission of prior art.

With the rapid technological development of flight vehicles, there is a rapidly-increasing demand for various types of flight vehicles, such as popular flight vehicles and subminiature flight vehicles. In this situation, research on swarm flight in which many fight vehicles fly in a formation group has been actively conducted to improve the performance of unmanned flight vehicles.

In this situation, research on unmanned flight vehicles of which flying controls are not operated directly by a person has also been conducted. In recent years, the unmanned flight vehicles have been utilized for various purposes, such as ordinary persons' leisure activities and movie shooting. In recent years, with the development of communication and computing technologies, research on the swarm flight in which instead of simply operating a single unmanned flight vehicle, one or more flight vehicles in a formation carry out special tasks, such as disaster relief, has been conducted.

RTG-GPS, an imaging technique, and the like have been utilized in a technology of determining a location of this unmanned flight vehicle. However, a technology of determining a location of a swarm flight vehicle using UWB has not yet been applied. Thus, the limitation of the swarm flight that utilizes RTK-GPS, the imaging technique, and the like has not been overcome.

Additionally, a UWB wireless communication technology refers to a wireless communication technology that can use an occupied bandwidth in an ultra-wideband of approximately 500 MHz or higher per channel within a range of predetermined emission limitation power and within an entire bandwidth range. The UWB wireless communication technology has the feature of having a relatively-low spectrum power density over a broad frequency band compared with a narrow-band system or a wide-band CDMA system in the related art and thus being able to be used with a communication system in the related art.

Outdoor Location Determining Technology

Outdoor location determining technologies include GPS, SBAS1), LPWA2), and RTK3) technologies. GPS is the commonest and most popular location determining technology using GPS satellites, but has the disadvantage of having the relatively-low degree of precision. SBAS and RTK technologies have been developed and applied to complement GPS. The expansion of IoT environments has led to development of LPWA, and LPWA entered commercial service.

Indoor Location Determining Technology

Indoor location determining technologies include Wi-Fi, BLE, Beacon, UWB, and Geo-Magnetic4) technologies. In recent years, location determining technologies utilizing an inertial sensor have also been developed. These location determining technologies have different degrees of precision and have respective advantages and disadvantages. Thus, the location determining technologies find application in various fields according to the use and purpose thereof.

1. RTK-GPS: This technology transmits a GPS signal corrected by a ground station and has the spatial limitation of the ground station.

2. Image+Radar: This technology uses an image and a radar sensor and has a night vision limitation.

3. Common RTLS: This technology uses LTE, 5G, WiFi, and the like and has a low-density swarm limitation suitable for a distance of approximately 5 m between flight vehicles.

4. UWB RTLS: This technology overcomes the low-density swarm limitation that is a problem with common RTLS, and is suitable for a distance of 30 cm between flight vehicles.

These technologies are disclosed in Korean Patent No. 101905052.

As reference information, the technologies in Korean Patent No. 101905052 provide control that can compensate for a difference in performance between flight vehicles due to different types of flight vehicles, deterioration in the performance of old-model flight vehicles, different performances and components, and the like and thus can allow many flight vehicles to synchronize with each other.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent No. 101905052

SUMMARY

An objective of the present disclosure is to a method of determining a location for swarm flight using UWB. The method is capable of tracking a location in real time on the basis of UWB in a free flight space and thus smoothly measuring the location for the swarm flight in a case where swarm flight vehicles fly in order to carry out a specific task.

Fundamentally, as is the case in the related art, in a method of determining a location for swarm flight using UWB according to an embodiment of the present disclosure measures, in a case where many swarm flight vehicles fly, a main controller of each of the many swarm flight vehicles determines a location thereof and controls a swarm flight operation in a manner that varies with each formation.

In this state, in a case where the location for the swarm flight is determined, each flight vehicle is defined as an object in UWB and location tracking is performed without a separate anchor.

Particularly, on the basis of this UWB TWR technique, a relative location in a swarm formation is computed from ranging scheduling in a master/slave format and from a pull-push relationship.

The method is specifically configured as follows.

According to an aspect of the present disclosure, there is provided a method of determining a location for swarm flight using UWB, in which in a case where many swarm flight vehicles fly, a main controller of each of the many swarm flight vehicles determines a location thereof and controls a swarm flight operation in a manner that varies with each formation, the method including: computing, by master and slave flight vehicles, preset among the many swarm flight vehicles, a reference location from GPS information in a case where the location is determined; sending out, by the master flight vehicle, a pulling signal, preset according to a TWR format, according to slave ranging scheduling corresponding to each formation, and receiving, by the master/slave flight vehicles, a pushing signal from a neighboring flight vehicle, and performing, by the master/slave flight vehicles, ranging; computing, by the master flight vehicle, a relative location in the formation on a master-slave basis from a ranged pull-push relationship using TWR time information, and computing, by the slave flight vehicle, the relative location in the formation on a slave-slave basis using RSSI and time of arrival (ToA); generating a fingerprint map in a manner that varies with each formation, using all the computed relative locations in the formation on the master-slave basis; and computing the location of the swarm flight vehicle using the generated fingerprint map.

In the method, the ranging scheduling may be performed in a manner that varies with each swarm formation, and the location is determined suitably for various swarm forms.

In the method, in a case where the ranging is performed, scheduling may be performed on the slave fight vehicles by a routine corresponding to each of many different formation types and in order corresponding thereto, and thus the ranging may be performed on a swarm-type basis.

In the method, in the case where the ranging is performed on the swarm-type basis, the scheduling may be performed, with a sequence for a routine based on each formation type being included, and thus, the ranging may also be performed on the swarm-type basis.

In the method, in the computing of the relative location, in a case where all the relative locations in the formation are computed on the master-slave basis, directivity may be provided to the relative locations using a change value of the RSSI, which results from a Doppler frequency deviation and is computed from the ranged pull-push relationship.

In the method, in the sending-out of the pulling signal, in a case where the ranging is performed, the location suitable for the pull-push relation may be recognized from a distance measurement format, and thus the ranging may be performed suitably for a swarm characteristic on a master/slave swarm basis.

According to the distance measure format, a) the master flight vehicle may send out the corresponding pulling signal to each slave flight vehicle having the same swarm ID in each formation, in a command format, and may instruct the slave flight vehicle to report thereto, and b) when the pulling signal is sent out, the slave flight vehicle, which includes a user memory in which the pull-push relationship in each formation is recorded, may read the user memory and may reply with the corresponding pushing signal in an event-driven format, and thus may report to the master flight vehicle.

In the method, in the sending-out of the pulling signal, in every case where the ranging is performed through the user memory, when receiving the pulling signal, the slave flight vehicle may read a preset address in the user memory, may repeatedly perform an operation of successively writing the pushing signal varying with each pull-push relation, into the user memory, and thus may compute the relative location using pull-push information.

In the method, in the sending-out of the pulling signal, in the case where the ranging is performed through the user memory, a command for the distance measurement format may be set in a manner that varies with each master-slave format corresponding to the swarm type, and thus the ranging may be performed suitably for a swarm form.

According to the embodiments of the present disclosure, the swarm flight of unmanned flight vehicles, each equipped with UWB RTLS, is provided using this UWB location determining technology to realize high-density swarm flight of the unmanned flight vehicles.

Particularly, in a case where the location for the swarm flight is determined in this manner, each flight vehicle is defined as an object in UWB and location tracking is performed without a separate anchor. Thus, a location is tracked in real time in a free space.

Particularly, the relative location in the swarm formation is computed from the ranging scheduling in a master/slave format and from the pull-push relationship on the basis of this UWB TWR technique. Thus, the location suitable for the swarm flight is determined in real time.

Furthermore, the degree of precision of the location of the swarm-type unmanned flight vehicle is increased. Thus, various flight vehicles and unmanned flight vehicles are controlled at the same time to maintain the swarm flight.

In addition, the flight vehicles can form and maintain a first target formation and while flying, can maintain the target formation in real time.

Moreover, a location of any one flight vehicle that fails to operate properly can be found on the basis of location information of each of the other flight vehicles.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a view illustrating the entire system to which the method of determining the location for the swarm flight using UWB according to the embodiment of the present disclosure is applied;

DETAILED DESCRIPTION

Figure 1:
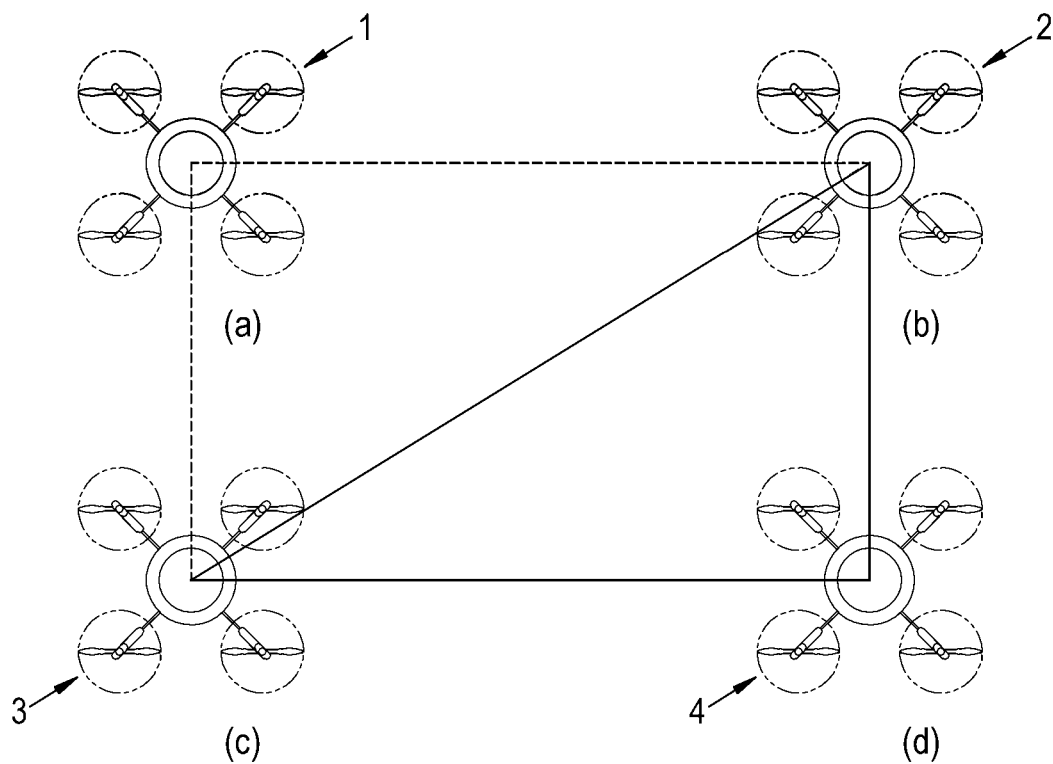
FIG. 1 is a conceptual diagram illustrating a system to which a method of determining a location for swarm flight using UWB according to an embodiment of the present disclosure is applied.

FIG. 1 is a conceptual diagram illustrating a system to which a method of determining a location for swarm flight using UWB according to an embodiment of the present disclosure is applied.

As illustrated in FIG. 1, in the system according to the embodiment of the present disclosure, as is the case in the related art, in a case where many swarm flight vehicles fly, fundamentally, a main controller of the many swarm flight vehicles controls flight using preset swarm flight information in the same manner, and thus the many swarm flight vehicles are set to carry out a specific task.

In this case, the system according to the embodiment of the present disclosure of the present disclosure in real time computes a relative location of a neighboring flight vehicle belonging to a swarm, by implementing a TWR location measuring technique (refer to FIGS. 2A and 2B) for the swarm flight using UWB. Thus, swarm flight is performed in various formations desired by a manager.

First, before going into detail on the location measuring technique for the swarm flight using UWB, normal swarm flight is broadly described.

Preferably, when carrying out a specific task, many flight vehicles 1, 2, 3, and 4 in the swarm flight, for example, have a geometric relationship therebetween and thus forms a rectangular-plane formation.

At this time, the flight vehicles 1, 2, 3, and 4 each have a specific geometric relationship therebetween and in real time detects the relative location of the neighboring flight vehicle.

In this case, the flight vehicles 1, 2, 3, and 4 each compare the formation and the relative location of the neighboring flight vehicle with each other and detect a flight error.

For example, a first flight vehicle 1 detects a relative location thereof on the basis of a triangular-plane formation formed by the other three flight vehicles 2, 3, and 4. To this end, the first to fourth flight vehicles transmit and receive information, such as a straight-line distance to a neighboring flight vehicle, an angle between the straight lines, and a ratio between the straight lines, to and from each other through wireless communication. For example, lengths of sides of a first right-angled triangle and lengths of sides of a second right-angled triangle are correspondingly compared with each other. When a difference in length occurs, it is determined that the flight error occurs in the first flight vehicle 1.

Then, the flight of the first flight vehicle 1 is controlled until the lengths of the sides of the first right-angled triangle and the lengths of the sides of the second right-angled triangle are correspondingly the same. Thus, the flight error is corrected.

Therefore, in a case where many swarm flight vehicles fly, this correction increases the degree of precision of the location of the swarm-type unmanned flight vehicle. Thus, this swarm flight provides an advantage in that many unmanned flight vehicles are controlled at the same time to maintain the swarm flight formation.

Furthermore, a location of any one flight vehicle that fails to operate properly can be found on the basis of location information of each of the other flight vehicles.

Figure 2A:
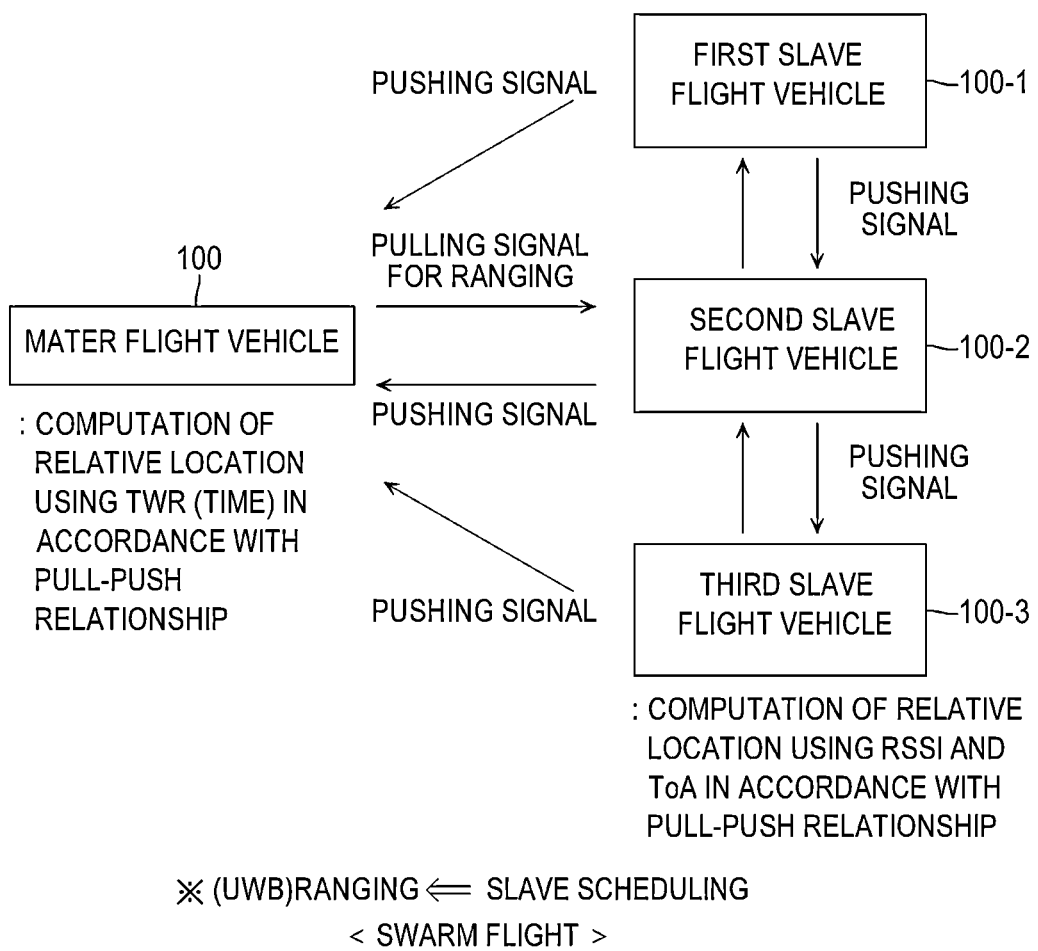
FIGS. 2A and 2B are conceptual views each illustrating the method of determining the location for the swarm flight using UWB according to the embodiment of the present disclosure.
Figure 2B:
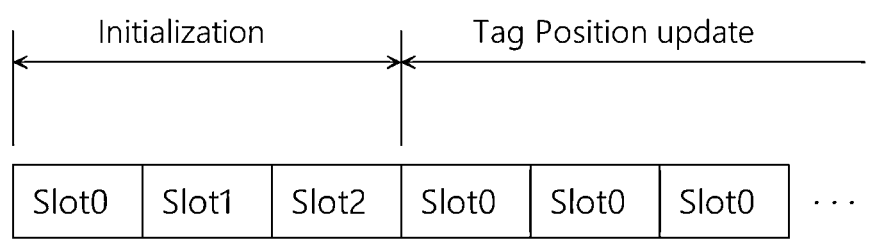

FIGS. 2A and 2B are conceptual views each illustrating the method of determining the location for the swarm flight using UWB according to the embodiment of the present disclosure.

As illustrated in FIGS. 2A and 2B, in the method of determining the location according to the embodiment of the present disclosure, when determining the location for the swarm flight, the relative location of a neighboring flight vehicle belonging to the swarm is computed in real time, by implementing the TWR location measuring technique for the swarm flight using UWB. Thus, the swarm flight is performed in various formations desired by the manager.

In this case, the TWR location measuring technique for the swarm flight using UWB is implemented as follows (refer to FIG. 2A).

First, in the above-described location measuring technique, when determining the location, a master flight vehicle 100 and slave flight vehicles 110-1 to 110-3, which are preset among many swarm flight vehicles, compute a reference location from GPS information.

Next, when computing the reference location in this manner, the master flight vehicle 100 sends out a pulling signal, preset according to a TWR format, according to slave ranging scheduling corresponding to each formation, and the master/slave flight vehicles 100 and 110 receive a pushing signal from a neighboring flight vehicle and performs ranging.

Therefore, from a pull-push relationship ranged in this manner, the master flight vehicle 100 computes a relative location in a formation on a master-slave basis using TWR time information.

That is, the slave flight vehicle performs the ranging according to scheduling with reference to the ranged pull-push relationship, computes a distance from the TWR time information of the master and slave flight vehicles, and thus computes the relative location in the formation.

Generally, the TWR technique is implemented as follows.

That is, the master side transmits information on a time at which the pulling signal and a final signal are transmitted and on a time at which a response signal of the slave side is received, in a state of being included in the form of a message in the final signal. Thereafter, the slave side obtains a distance between the master and slave flight vehicle sides using information on a time at which the pulling signal and the final signal are received and on a time at which the response signal is transmitted, and information on a time at which the master side transmits the pulling signal and the final signal and on a time at which the response signal of the slave side is received.

In addition, the slave flight vehicles 110-1 to 110-3 compute the relative location in the formation on a slave-slave basis using a received signal strength indicator (RSSI) and time of arrival (ToA).

Specifically, the slave flight vehicles 110-1 to 110-3 perform the ranging according to the scheduling. In addition, a distance is computed from a reference RSSI that is preset on a pull-push relationship basis, a signal intensity change in accordance with a currently ranged pull-push relationship, that is, an RSSI ratio, and the TWR time information of the master and slave flight vehicles, and thus the relative location in the formation is computed.

Thereafter, with the relative locations in each formation on the master-slave basis and on the slave-slave basis, a fingerprint map is generated in a manner that varies with each formation.

Next, accordingly, with the fingerprint map, that is, a fingerprint map based on a swarm form, the location of the swarm flight vehicle is computed.

Therefore, in the method of determining the location according to the embodiment of the present disclosure, when determining the location for the swarm flight, on the basis of this UWB TWR technique, a relative location in a swarm formation is computed from ranging scheduling in a master/slave format and from a pull-push relationship. Thus, the location suitable for the swarm flight is determined in real time.

In this case, the ranging scheduling is performed in a manner that varies with each swarm formation, and the location is measured suitably for various swarm forms.

In addition, fundamentally, this location measuring technique is implemented as follows.

That is, first, when computing a location of a flight vehicle, the master flight vehicle serving as a reference flight vehicle is determined, a distance between neighboring slave flight vehicles is measured on the basis of GPS coordinates by implementing a two way ranging (TWR) technique, and thus the location is computed. In this manner, relative coordinates of each of the flight vehicles are computed.

This ranging scheduling, for example, is performed as follows.

First, a master node divides a preset frame and allocates the resulting subframe to slave nodes. The frame here is a preset time interval. The master node may divide the frame into slave transmission times for the slave nodes. Then, the master node may allocate a slave transmission time to each of the slave nodes. In addition, the master node generates scheduling information as a result of the scheduling.

Next, the master node transmits the scheduling information. At this time, the scheduling information may further include pieces of identification information of the master node and the slave nodes. Then, the master node may transmit the scheduling information in a state of being inserted into a beacon message. The beacon message is for time synchronization in a location tracking system. In addition, the master node transmits the beacon message in all directions. Alternatively, the master node may transmit the beacon message using pieces of identification information of tag nodes and the pieces of identification information of the slave nodes.

At this time, in a communication system and a coordinate setting technique, a frame for determining a location may be configured by setting slots in various ways.

For example, the frame for determining a location is configured with one slot for each master flight vehicle. For example, the frame for measuring a location is configured with three slots in a case where there exist three master flight vehicles. The master flight vehicles each control one slot.

In this case, the slot may be configured with an initialization section and a slave location determining section.

FIG. 2B is a view illustrating this slot.

As illustrated in FIG. 2B, the initialization section is a section in which each master flight vehicle measures a distance between the slave flight vehicles using the pulling signal, the pushing signal (response signal), and the final signal.

The slave location determining section is a section in which the slave flight vehicle computes a location thereof using the pulling signal and the pushing signal.

More specifically, for example, the initialization section is configured with slots, that is, with Slot 0, Slot 1, and Slot 2.

Then, during this initialization section, the distance between each of all the flight vehicles is measured. three-dimensional coordinates (x, y, z) are computed on the basis of the measured distances.

Next, after the initialization section elapses, transmission at Slot 0 is repeated and the location of the slave flight vehicle is computed.

Then, in a case where the locations of the slave flight vehicles are changed or need to be reset, the initialization section is reset with an external input, thereby increasing the efficiency of the system.

Additionally, regarding this ranging scheduling, the master/slave flight vehicle integrates timing profiles into one timing profile. For example, one timing profile is used between the master flight vehicle and the slave flight vehicle, and the time synchronization with the master flight vehicle is performed. Thus, one location determining system is configured.

For reference purpose, a TWR technique in the related art is broadly described.

First, in the TWR technique, a distance is computed with two packets.

Then, a specific apparatus A transmits the packet indicating the start of the ranging to neighboring apparatuses.

At this time, the apparatus A measures a round trip time(tround) from a point in time at which the packet is transmitted.

Then, as a response, the apparatus that receives the packet from the apparatus A transmits a packet including ranging data to the apparatus A after a response relay time, which is a time preset by the system, elapses.

The response relay time here refers to a response delay time($e_A$:A response delay time, $e_B$:B response delay time) that is an interval from the end of the received packet to the beginning of the next-transmitted packet.

Therefore, the apparatus A ($t_{reply}$) and receiving the corresponding packet estimates a signal arrival time from the apparatus A to the neighboring apparatus through a computation process as in following Equation 1.

At this time, a distance between the apparatus A and the neighboring apparatus is estimated from the signal arrival time estimated in this manner.

$$t_p = \frac{1}{2}(t_{round}(1+e_A) - t_{reply}(1+e_B)) \qquad \text{[Equation 1]}$$

Next, a ToA technique in the related art is also described.

(a) According to the principle of operation of an RT-ToA technique, for example, when an A transceiver transmits a signal A, a B transceiver receives the signal A. After the receiving is completed, the B transceiver transmits a signal B, which is a response signal.

(b) The B transceiver transmits to the A transceiver a value obtained by measuring the time that elapses from when the receiving of the signal A is completed to when the transmitting of the signal B is completed. When transmitting a measurement value to the A transceiver, the B transceiver needs two additional signals, that is, a data transmission signal for transmitting the measurement value and a signal responding to the data transmission signal from the A transceiver.

(c) Then, a ToA value is computed without exception using ToA=(Tround−Treply)/2. A spatial distance between the A transceiver and the B transceiver can be obtained by multiplying the ToA value by a signal transmission speed c of a medium.

FIG. 3 is a view illustrating the entire system to which the method of determining the location for the swarm flight using UWB according to the embodiment of the present disclosure is applied.

As illustrated in FIG. 3, in a case where many swarm flight vehicles fly, as is the case in the related art, in the system according to the embodiment of the present disclosure, fundamentally, a main controller of each of the many swarm flight vehicles determines a location thereof and controls a swarm flight operation in a manner that varies with each formation.

In this case, in the system according to the embodiment of the present disclosure, each flight vehicle is defined as an object in UWB. Then, location tracking is performed without a separate anchor, and thus a location is tracked in real time in a free space.

That is, in a case where UWB is used in a manner that does not limit a specific location in the free space, UWB is used as each object without any distinction between anchors/tags to the flight vehicles and thus a 3D location in a triangulation structure is tracked.

As reference information, a space limitation of RTK-GPS, an image night-vision limitation, and a flight vehicle density limitation of common RTLS have not been overcome up to now. Particularly, common RTLS, when is applied using a current technology other than UWB, guarantees a distance of approximately 5 m.

In this case, in the location determining method, as described above, the relative location in the swarm formation is computed from the ranging scheduling in the master/slave format and from the pull-push relationship. Thus, the location suitable for the swarm flight is measured in real time.

At this time, in the location determination, for example, triangulation is utilized. Additionally, the triangulation uses two-way ranging (TWR) and, for example, measures an actual distance using 2D RTLS or 3D RTLS.

Figure 4:
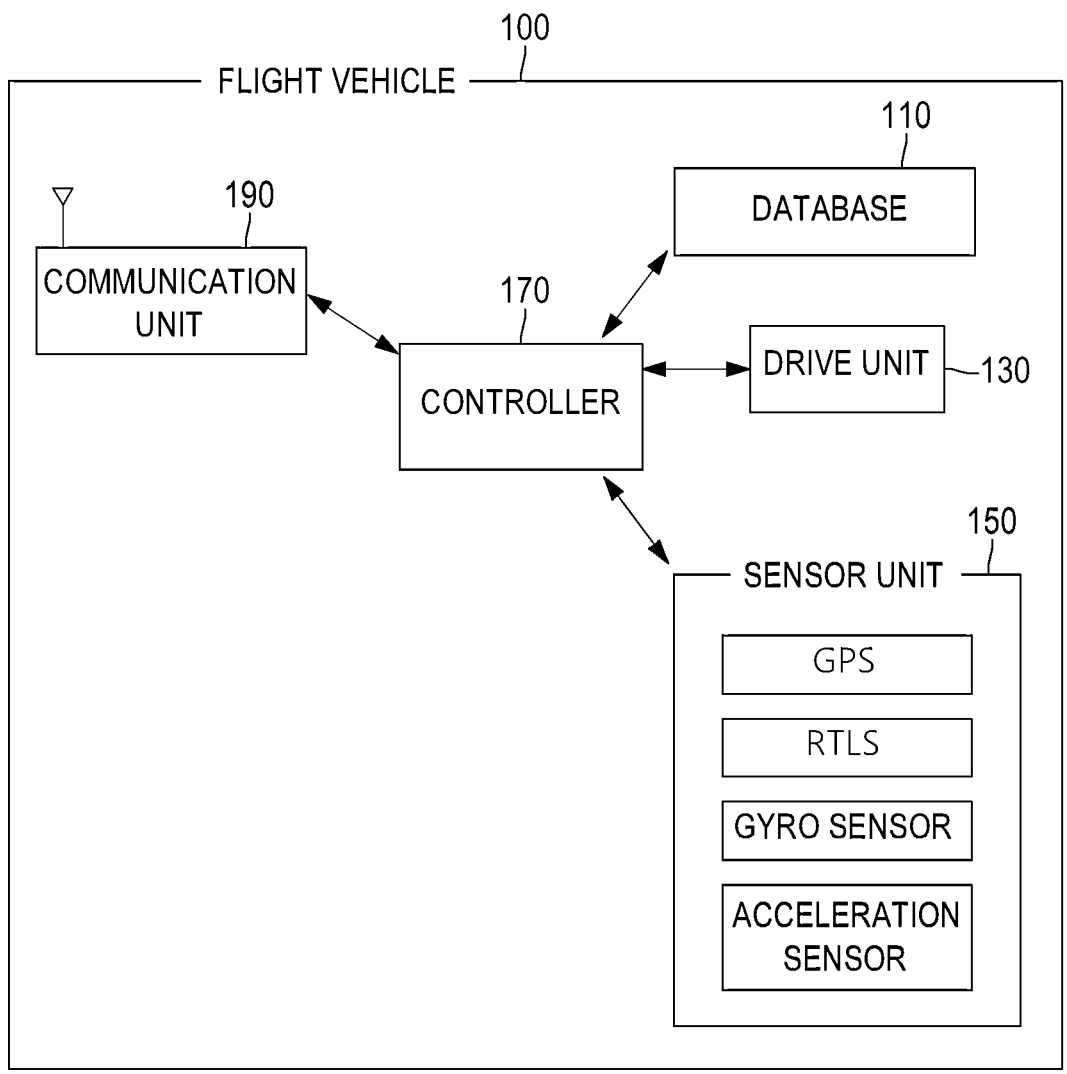
FIG. 4 is a block diagram illustrating a configuration of a flight vehicle to which the method of determining the location for the swarm flight using UWB according to the embodiment of the present disclosure is applied.

FIG. 4 is a block diagram illustrating a configuration of the flight vehicle to which the method of determining the location for the swarm flight using UWB according to the embodiment of the present disclosure is applied.

As illustrated in FIG. 4, a flight vehicle according to an embodiment of the present disclosure includes a database 110, a drive unit 130, a sensor unit 150, a controller 170, and a communication unit 190.

The flight vehicle stores related information including a geometric relationship for the swarm flight and operates according to this swarm flight information.

For reference, the swarm flight information is generated by an external server, or is received from the external server through the communication unit 190 and is stored in the database 110.

The controller 170 extracts the swarm flight information from the database 110 and accordingly controls operation of the drive unit 130 in such a manner as to enable the flight vehicle to fly. In this case, when determining the location for the swarm flight, according to an embodiment of the present disclosure, the controller 170 computes the relative location in the swarm formation in the swarm formation from the ranging scheduling in the master/slave format and from the pull-push relationship on the basis of the UWB TWR technique, and thus the location suitable for the swarm flight is determined in real time. At this time, the ranging scheduling is performed in a manner that varies with each swarm formation and thus the location is determined suitably for various swarm forms. Furthermore, in order to uniformly maintain the swarm formation, the controller 170 compares the swarm flight information and the distance to the neighboring flight vehicle with each other and detects the flight error. To this end, for example, the controller 170 measures the distance to the neighboring flight vehicle and thus computes the geometric relationship. Then, the controller 170 determines whether or not the measured geometric relationship is the same as a preset specific geometric relationship. Therefore, in a case where it is determined that the measured geometric relationship is not the same as the preset specific geometric relationship, it is determined that the swarm flight is changed, and thus the flight error is corrected. In the specific geometric relationship here, for example, at least one of the straight-line distance to the neighboring flight vehicle, the angle between the straight lines, and the ratio between the straight lines is preset as a specific value. In addition, specific geometric relation information may include mathematical information that is applied to a specific figure. The specific figures here include two-dimensional figures, such as a triangle, a rectangle, and a circle, and three-dimensional figures, such as a cone, a quadrangular pyramid, a square pillar, a hexagonal pillar, and a sphere.

The sensor unit 150, for example, is configured as at least one of a GPS, a real-time locating system (RTLS), a gyro sensor, an acceleration sensor, a camera sensor, and a magnetometer sensor. The sensor unit 150 acquires values (that is, ranging signals) for measuring the distance to the neighboring flight vehicle in order to compute location information of the flight vehicle. At this time, the sensor unit 150 analyses measurement values obtained by the gyro sensor and the acceleration sensor and the measurement values obtained thereby that are changed within a preset time, and thus computes an azimuthal value of the flight vehicle or estimates an altitude of the flight vehicle and a change in the altitude.

The communication unit 190 transmits and receives a message and flight information to and from the flight vehicles through socket communication.

Figure 5:
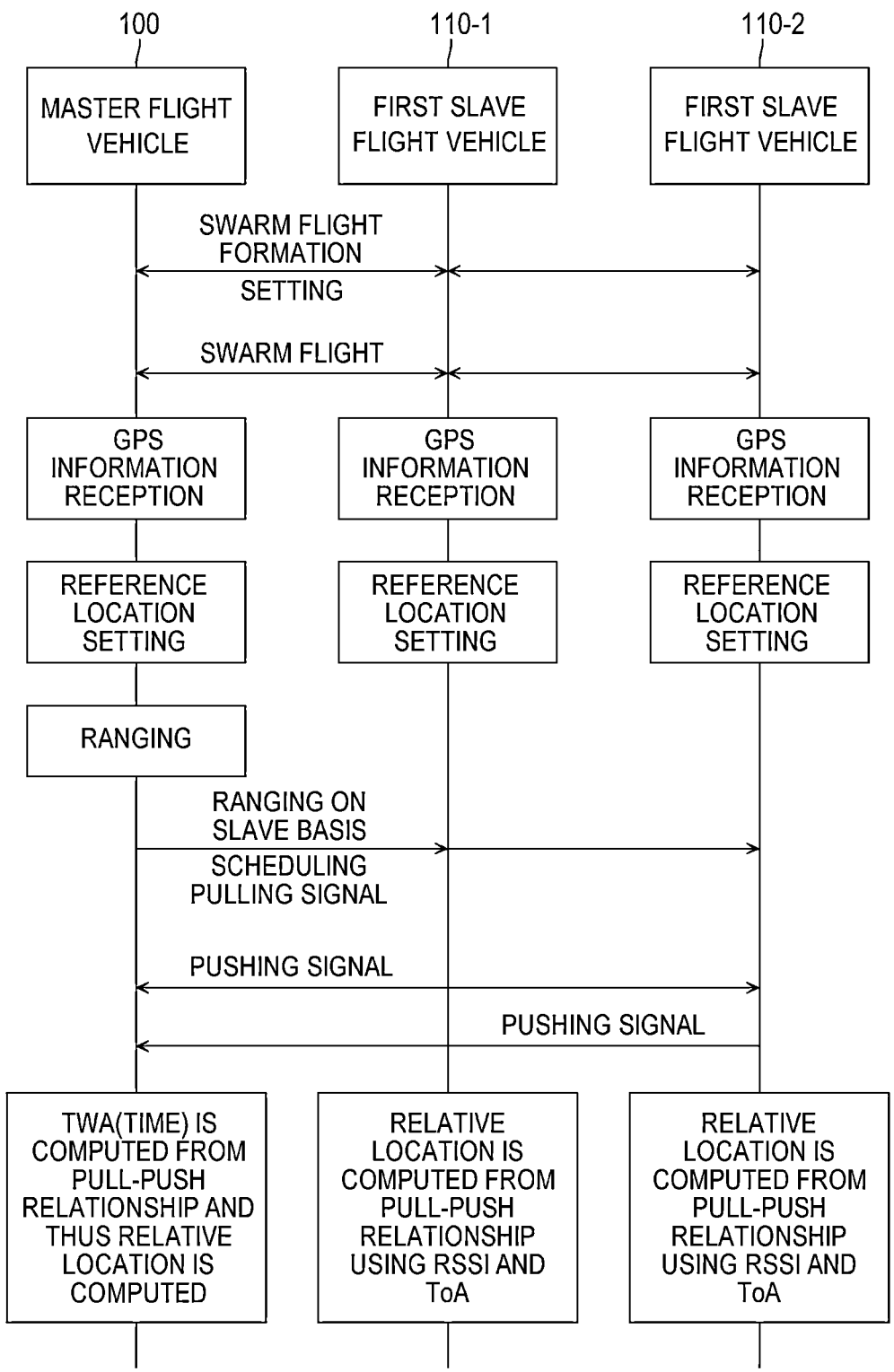
FIG. 5 is a flowchart sequentially illustrating operations that are performed in the method of determining the location for the swarm flight using UWB according to the embodiment of the present disclosure.

FIG. 5 is a flowchart sequentially illustrating operations that are performed in the method of determining the location for the swarm flight using UWB according to the embodiment of the present disclosure.

As illustrated in FIG. 5, in the method of determining the location for the swarm flight using UWB according to the embodiment of the present disclosure, when determining the location for the swarm flight, first, the master flight vehicle 100 and the slave flight vehicles 110-1 and 110-2, which are predetermined within many swarm flight vehicles, compute the reference location from the GPS information.

When the reference location is computed in this manner, the master flight vehicle 100 sends out the pulling signal, preset according to the TWR format, according to the slave ranging scheduling corresponding to each formation, and the master/slave flight vehicles 100 and 110 receive the pushing signal from the neighboring flight vehicles and performs the ranging.

For example, in a case where this ranging is performed, scheduling is performed on the slave fight vehicle by a routine corresponding to each of the many different formation types and in the order corresponding thereto, and thus the ranging is performed on a swarm-type basis. Alternatively, in a case where the ranging is performed on the swarm-type basis, the scheduling is performed, with a sequence for a routine based on each formation type being included, and thus, the ranging may also be performed on the swarm-type basis.

Therefore, from the pull-push relationship ranged in this manner, the master flight vehicle 100 computes the relative location in the formation on the master-slave basis using TWR time information.

In addition, the slave flight vehicles 110-1 and 110-2 compute the relative locations in the formation on the slave-slave basis using RSSI and ToA.

Additionally, in this case, the directivity is provided to the relative location and thus, the location may be precisely determined.

For example, in a case where the relative location in the formation is computed on the master-slave basis, the directivity is provided to the relative location using a change value of RSSI, which results from a Doppler frequency deviation and is computed from the ranged pull-push relationship. At this time, the Doppler frequency deviation includes a Doppler frequency direction and a deviation value.

Then, with the computed relative locations in the formation on the master-slave basis and on the slave-slave basis, the fingerprint map is generated in a manner that varies with each formation.

At this time, in a case where the fingerprint map is generated, as a different implementation example, the relative location is computed on the master 100/slave 110 basis from a pre-registered wave map DB for the ranging on the basis of RSSI in accordance with the pull-push relation based on each of the many different formations, and the fingerprint map is generated in an integrated manner on the basis of each of the many formations.

For example, the wave map DB for the ranging first divides the locations by a signal for the ranging, that is, by an RSSI level in accordance with the pull-push relationship in each formation.

Then, in a case where the relative location for the swarm flight is actually computed, an actual RSSI level (or rate) and a registered RSSI level are compared with each other and the map is generated. Additionally, the azimuthal value may be computed according to direction information that uses the Doppler principle between transmission and reception signals for the ranging, that is, according to Doppler frequency deviation information.

Therefore, with the generated fingerprint map, the location of the swarm flight vehicle is accordingly computed.

As described above, according to the embodiment of the present disclosure, when determining the location for the swarm flight, each flight vehicle is defined as an object in UWB. Then, the location tracking is performed without a separate anchor, and thus the location is tracked in real time in the free space.

Particularly, the relative location in the swarm formation is computed from the ranging scheduling in the master/slave format and from the pull-push relationship on the basis of this UWB TWR technique. Thus, the location suitable for the swarm flight is determined in real time.

In this case, the ranging scheduling is performed in a manner that varies with each swarm formation, and the location is determined suitably for various swarm forms.

In a method of controlling a flight vehicle according to another embodiment of the present disclosure, as is the case in the related art, when determining the location with the triangulation that uses TWR, the frequency with which an error occurs due to a clock difference between two nodes on the transmission and reception sides can be reduced.

To this end, in the case of this location determination, when the location of the flight vehicle is tracked in real time, the clock difference between the two nodes is compensated for, by performing symmetric double-sided TWR, and thus the error is reduced.

At this point, in TWR, a process is performed in the following order: Request>ACK+Request>ACK>DATA Report. Then, ToF is {(troundA−treplyA)+(troundB−treplyB)}/4. Therefore, the clock difference between the two nodes is compensated for, through this exchange of an additional message, and thus the error is reduced.

For reference, in TWR in the related art, a process is performed in the following order; Request>ACK. Then, ToF is (troundA−treply)/2. Therefore, there is a likelihood that the error will occur due to the clock difference between the two nodes. There is also a likelihood that a lot of tags will be accommodated due to exchange of the small number of packets.

Particularly, in addition to this technique in the related art, according to an embodiment of the present disclosure, in a case where the relative locations between the master and slave flight vehicles 100 and 110 are computed without exception, the clock difference between the two nodes is compensated for, by performing symmetric double-sided TWR corresponding to the pull-push relationship in each of the many different formations, and thus the error is reduced on the basis of each of the many formations.

At this time, in a case where the clock difference is compensated for in each of the different formations, the clock difference between the two nodes is the second time compensated for, by performing the symmetric double-sided TWR according to the ranging schedule that varies with each slave flight vehicle in the same formation.

As reference information, when the master and slave flight vehicles are designed, fundamentally, the use of the same antenna and the same distance from the antenna to an electrode of an MMIC chip, and the use of the processor and the same signal processing program cause the same reception delay and thus minimize the error in the way described above.

According to another embodiment of the present disclosure, in a case where the ranging is performed as described above according to the embodiment of the present disclosure, the location suitable for the pull-push relation is recognized from the following distance measurement format, and thus the ranging can be performed suitably for a swarm characteristic on a master/slave swarm basis.

Specifically, according to the distance measurement format, a) first, the master flight vehicle 100 sends out the pulling signal corresponding to each slave flight vehicle having the same swarm ID in each formation, in a command format, and instructs the slave flight vehicle to report thereto, and b) next, when the pulling signal is sent out, the slave flight vehicle, which includes a user memory in which the pull-push relationship in each formation is recorded, reads the user memory and replies with the corresponding pushing signal in an event-driven format, and thus reports to the master flight vehicle.

Additionally, in every case where the ranging is performed through the user memory, when receiving the pulling signal, the slave flight vehicle reads a preset address in the user memory, and repeatedly performs an operation of successively writing the pushing signal varying with each pull-push relation, into the user memory. Thus, the slave flight vehicle computes the relative location using pull-push information.

At this time, a data reading operation and a data writing operation in accordance with the pull-push relation are performed without exception in a manner that corresponds to the distance between the master and slave flight vehicles, and thus pull-push rate information can be acquired.

Additionally, in a case where the ranging is performed through the user memory, a command for the distance measurement format is set in a manner that varies with each master-slave format corresponding to the swarm type, and thus the ranging is performed suitably for the swarm form.

Figure 6:
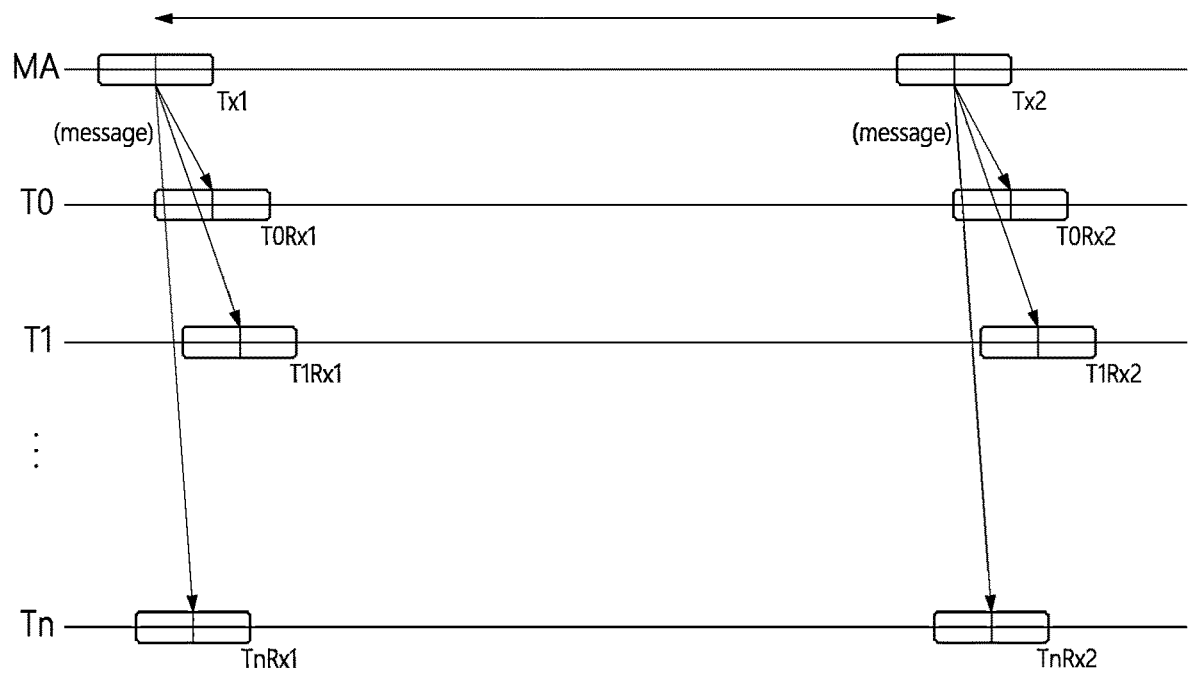
FIG. 6 is a view illustrating another information acquisition technique in the method of determining the location for the swarm flight using UWB according to the embodiment of the present disclosure.

FIG. 6 is a view illustrating another information acquisition technique in the method of determining the location for the swarm flight using UWB according to the embodiment of the present disclosure.

As illustrated in FIG. 6, the information acquisition technique according to the embodiment of the present disclosure is performed as a location information acquisition process that uses an SDS TWR technique.

At this point, TWR, in which a plurality of packets are exchanged between the flight vehicles, corresponds to a technique of computing a distance and determining a location.

Then, TWR does not need clock synchronization between the flight vehicles (AP), compared with TDOA, and has the advantage of having the high degree of precision in external location determination. In addition, the TWR technique has the feature that three or more neighboring flight vehicles obtain a distance and compute a location using the triangulation.

Specifically, this TWR technique corresponds to symmetric double side two-way ranging (SDS-TWR).

First, when the master flight vehicle transmits a pulling packet to the slave flight vehicle, the slave flight vehicle replies with a pushing packet.

Then, when the master flight vehicle transmits a final packet, the slave flight vehicle computes the distance using a time value with respect to each packet.

At this time, the final packet is transmitted in a state of containing a pulling TGx time(Poll Tx Time), a pushing Rx time(Resp RX Time), a final Tx time(Finale Rx Time). Thus, a distance value is computed with a total of six time values (Rsep Tx Time, Finale Rx Time, Resp Rx Time) including the three time values contained in the final packet.

In this case, the distance value is computed as in following Equation 2.

Distance=speed of light×((Resp *RX* Time−Poll *Tx* Time)−(Resp *Tx* Time−Poll *Rx* Time)+(Finale *Rx* Time−Resp *Tx* Time)−(Finale *Tx* Time−Resp *Rx* Time))/4     [Equation 2]

A technique of computing an azimuthal angle, which is applied to this location information acquisition process, is as follows.

First, the master and slave flight vehicles each verify the distance obtained by the SDS-TWR technique, through the above-described UWB communication.

Next, at a point in time where the SDS-TWR technique is implemented, for example, among four flight vehicles, two pairs of sets, one positioned on the vertical axis in a plane and the other positioned on the horizontal axis therein, are set.

Then, the azimuthal angle between the two flight vehicles constituting each pair and the neighboring flight vehicle is computed, and thus first azimuthal angle information and second azimuthal angle information, which are two pieces of azimuthal angle information, are acquired. That is, among the four flight vehicles, the azimuthal angle is computed with a set of two flight vehicles, a distance between which is long.

At this time, Kalman filtering is performed on the computed azimuthal angle, and thus a smoothing effect may be provided.

Next, a weighting factor is applied to the azimuthal angle in which an angle between the two axes is relatively close to the vertical angle, of the two azimuthal angles computed in this manner, and then an average value of two azimuthal angles is computed.

Therefore, the technique of computing the azimuthal angle, which is used in the above-described location information acquisition process, is accordingly implemented.

Next, a time profile is described according to an additional aspect. For reference, the time profile indicates operation of each of the master and slave flight vehicles.

Specifically, a preset interval occurs between two signals ($Tx_1, Tx_2$) transmitted by the master flight vehicle. Then, many slave flight vehicles each receive these two signals ($Rx_1, Rx_2$). At this point, time intervals are the same.

Then, the interval ($\Delta Tx$) between the signals transmitted by the master flight vehicle is expressed as in following Equation 3.

$$\Delta Tx = Tx_2 - Tx_1 \quad \text{[Equation 3]}$$

Next, an interval ($\Delta Rx$) between the signals received by the slave flight vehicle is expressed as in following Equation 4.

$$\Delta Rx = Rx_2 - Rx_1 \quad \text{[Equation 4]}$$

Then, when a clock used by the master flight vehicle and a clock used by each slave flight vehicle are the same, fundamentally, $\Delta Tx$ and $\Delta Rx$ are the same.

However, in practice, a frequency deviation occurs in a clock used by the master and slave flight vehicles, more specifically, in an internal oscillator. Thus, $\Delta Tx$ and $\Delta Rx$ are different from each other.

Therefore, skew of a receiver clock from a transmitter clock are expressed as in following Equation 5.

$$\text{skew} = \Delta Rx / \Delta Tx \quad \text{[Equation 5]}$$

A preset interval occurs between two transmission signals, each containing a message for a transmission time (delaying as To), transmitted by a transmitter. Then, a receiver records a reception time and obtains the skew of the receiver clock from the transmitter clock as in following Equation 6.

$$\text{skew} = (ToR_2 - ToR_1)/(ToT_2 - ToT_1) \quad \text{[Equation 6]}$$

Therefore, if the skew of the receiver clock is obtained, when determining the location, the time at which the receiver receives the signal is corrected to the time of the transmitter, serving as a reference time, at which the receiver receives the signal. Thus, a precise location is computed.

Additionally, an example of a situation where this location measuring technique is used is described.

First, in a case where n (n is an arbitrary integer) unmanned swarm flight vehicles carry out a specific task, an alerting signal for providing an indication of a flight path change is transmitted, for example when among swarm flight vehicles, at least one unmanned flight vehicle flies a predetermined distance away from the above-described relative location in a formation.

Next, the master flight vehicle tracks a neighboring slave flight vehicle having a likelihood of a collision occurring.

Then, flight paths are adjusted with respect to each other until the number of the flight vehicles having the likelihood of a collision occurring becomes 0.

Therefore, n flight paths of the flight vehicles that are available when the number of the flight vehicles having the likelihood of a collision occurring becomes 0 are determined.

Accordingly, a change takes place from current flight paths to the flight path that are determined without exception in this manner.

In this collision avoidance technique, in a case where at least one unmanned flight vehicle abruptly changes a flight path thereof, other unmanned flight vehicles correspondingly change flight paths thereof. Thus, the collision avoidance technique includes a process of optimizing flight paths of all the n unmanned flight vehicles currently in flight.

That is, although many unmanned flight vehicles fly along designated paths, the flight paths of the unmanned flight vehicles are adjusted with respect to each other using this technique because an unexpected situation can occur. Thus, the unexpected situation is easily dealt with.

Particularly, the unmanned flight vehicle may first change the flight path thereof in order to take action to avoid an obstacle. Therefore, the flight paths of the other unmanned flight vehicles are adjusted with respect to each other, and thus the flight paths of all the n unmanned flight vehicles in flight are optimized while the first action to avoid the obstacle is taken.

Accordingly, a collision among many unmanned flight vehicles that fly in a distributed manner in a flight area or fly in a swarm formation, or a collision with a different object is prevented. Furthermore, many unmanned flight vehicles are effectively controlled.

Additionally, the n unmanned flight vehicles can fly while communicating with a control station. The n unmanned flight vehicles and the control station exchange data with each other through remote wireless communication. The unmanned flight vehicles, each having the flight capability, communicate with the control station and fly in desired directions along programmed flight paths.

The n unmanned flight vehicles collect images captured thereby, detection signals detected by sensors (including a proximity sensor and a temperature sensor), positional data related to flight situations, data related to weather, and the like, and transmit the collected images, signals, and data to the control station. Then, the control station receives the collected images, signals, and data, and thus monitors the flight situations of the unmanned flight vehicles, monitors areas over which the unmanned flight vehicles fly, or accumulates related data. At this time, in some cases, the control station may transmit additional data and may provide an instruction to change a flight path for performing a specific task.

In this manner, among the n unmanned flight vehicles in flight, at least one unmanned flight vehicle that faces an obstacle may transmit an alarm signal for providing an indication of the change in the flight path. At this time, the obstacle is one that does not appear on the programmed flight path and is abruptly found. Therefore, the unmanned flight vehicle detecting the obstacle performs an obstacle avoidance process of promptly avoiding an obstacle. Accordingly, there can occur a problem in that interference is caused between the flight paths of the unmanned flight vehicles.

Therefore, the unmanned flight vehicle that needs to transmit the alarm signal promptly changes the flight path thereof according to the obstacle avoidance process and then transmits the alarm signal, or transmits the alarm signal and then changes the flight path. That is, in order to promptly avoid the obstacle, the unmanned flight vehicle first performs avoidance flight and then transmits the alarm signal to alert the control station to the flight for the avoidance flight. Then, in a case where it is detected that the obstacle is at a distance suitable for avoidance, the alarm signal is transmitted before starting the avoidance flight or while performing the avoidance flight. At this time, the location, speed, flight path, and the like of the unmanned flight vehicle are provided together.

Accordingly, in a case where the flight path of the unmanned flight vehicle is computed, the flight paths of all the n unmanned flight vehicles are compared with each other, and the unmanned flight vehicle having the likelihood of a collision occurring is tracked.

For example, the unmanned flight vehicle having the likelihood of a collision occurring is tracked, comprehensively considering entire flight data, the size of each unmanned flight vehicle, and the like, as well as the flight path of each unmanned flight vehicle. At this time, a collision can also occur due to a weak air current or the like, depending on how far the changed flight path of the unmanned flight vehicle transmitting the alarm signal is from the flight path of another unmanned flight vehicle. Therefore, considering this situation, the unmanned flight vehicle having the likelihood of a collision occurring is tracked. Then, the flight paths of all the n unmanned flight vehicles are compared with each other in this manner, and thus the unmanned flight having the likelihood of a collision occurring is tracked.

Then, when the unmanned flight vehicles having the likelihood of a collision occurring are found, the flight paths of the unmanned flight vehicles other than the unmanned flight vehicle transmitting the alarm signal are adjusted with respect to each other until the number of the unmanned flight vehicles having the likelihood of a collision occurring becomes 0.

Specifically, until the unmanned flight vehicle that first performs the avoidance flight completely avoids the obstacle, the flight paths of the other flight vehicles are correspondingly adjusted, and thus the likelihood of additional collision is removed.

Accordingly, subsequent possible collisions, such as the second collision and the third collision, due to the change in the flight path to avoid the obstacle and to the adjustment of the flight paths, are prevented, and many unmanned flight vehicles are controlled in such a manner as to fly along more optimized flight paths.

Additionally, the adjustment of the flight paths is made as follows.

That is, the flight paths of the unmanned flight vehicles are optimized, considering GPS information and geographic-feature information of the unmanned flight vehicle, image information captured in real time by the unmanned flight vehicle, sensing information of the unmanned flight vehicle, and the like.

Accordingly, a current location and an ambient situation of each unmanned flight vehicle, an obstacle ahead of each unmanned flight vehicle, and the like are recognized, and thus the flight paths are more actively adjusted.

Although any one of the unmanned flight vehicles first changes the flight path thereof to avoid the obstacle, an adjustment can be made in such a manner that the flight paths of the other unmanned flight vehicles can be changed in a different way than the flight path is first changed.

Additional interference to and from the flight paths due to the adjustment of the flight paths can occur. Thus, for example, the degree to which each of the flight paths of the unmanned flight vehicles is changed is set to be lower than the degree to which the flight path is first changed by the unmanned flight vehicle.

At this time, the degree to which the flight path is changed is determined by recognizing the distance between the unmanned flight vehicles, the sizes thereof, and the like from the above-described flight data and is set to be gradually decreased at a suitable ratio in such a manner that the collision among the unmanned flight vehicles is smoothly avoided.

When the degree to which the flight path is changed is adjusted in this manner, additional interference to and from the flight paths of the unmanned flight vehicles, which is caused by the adjustment of the flight paths, is minimized. That is, the flight paths are organically adjusted considering the distance between the unmanned flight paths and the like. Thus, successive interference is minimized, and the number of the unmanned flight vehicles capable of flying along original flight paths without any change therein is increased. Accordingly, the flight paths of all the unmanned flight vehicles are optimized in such a manner that many unmanned flight vehicles remove the risk of colliding with each other and smoothly carry out original tasks as planned.

For example, in a case where the unmanned flight vehicles fly in opposite directions, the flight paths can be easily adjusted and optimized. For example, the flight paths of the unmanned flight vehicles, including the unmanned flight vehicle having the likelihood of a collision occurring, other than the unmanned flight vehicles flying in opposite directions, can be adjusted in such a manner that the degree to which the unmanned flight vehicles flying in opposite directions are changed is the same as the degree to which the flight path is first changed. Accordingly, the flight paths are set in such a manner that the collision between the unmanned flight vehicle and the obstacle, as well as the collision among the unmanned flight vehicles, are avoided.

In addition, the process of adjusting the flight path of the unmanned flight vehicle includes a process of avoiding the collision through at least one of horizontal-direction and vertical-direction changes in the flight path of the unmanned flight vehicle at a point where the unmanned flight vehicles having the likelihood of a collision occurring intersect. That is, in a case where the unmanned flight vehicle first avoiding the obstacle flies horizontally and interferes with the flight path of an adjacent unmanned flight vehicle, the adjacent unmanned flight vehicle changes the flight path thereof vertically to avoid the unmanned flight vehicle interfering with the flight path thereof. Accordingly, the degree to which the flight paths of all the unmanned flight vehicles are changed as a whole is minimized.

Another operation of avoiding the obstacle is additionally described.

Specifically, when the unmanned flight vehicle, remotely controlled, detects the obstacle while in flight, a process is performed in such a manner that the flight direction is automatically changed.

That is, the unmanned flight vehicle generates an electromagnetic wave in real time to the outside while in flight. At this time, it is determined whether or not a reflection wave, which is the reflected electromagnetic wave, is received.

When the reflection wave is received, that is, when the electromagnetic reflected from the object is received, a distance to the obstacle is computed. Next, the collision with the obstacle is estimated considering the computed distance, the speed of the unmanned flight vehicle, and the like. For example, when the result of the computation of the distance to the obstacle is that the obstacle is at or below a threshold, it is estimated that the collision will occur.

Next, when the obstacle is detected, the flight path of the unmanned flight vehicle is no longer adjusted with remote control and the unmanned flight vehicle switches the flight direction to a direction opposite to a currently flying direction.

Subsequently, when a predetermined time (for example, approximately 2 to 5 seconds) elapses from when the unmanned flight vehicle switches the flight direction to the opposite direction, the flight path of the unmanned flight vehicle is allowed to be adjusted with remote control.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of determining locations of a plurality of swarm flight vehicles for swarm flight using ultra-wideband (UWB), wherein a main controller of each of the plurality of swarm flight vehicles determines a location thereof and controls a swarm flight operation in a manner that varies with each formation, the method comprising:
   computing, by a master flight vehicle that is preset among the plurality of swarm flight vehicles and slave flight vehicles, reference locations based on GPS information;
   ranging, which comprises:
      sending out, by the master flight vehicle, a pulling signal that is preset according to a two-way ranging (TWR) format to the slave flight vehicles, based on slave ranging scheduling corresponding to each, formation;
      in response to receiving the pulling signal, transmitting, by the slave flight vehicles, pushing signals to the master flight vehicle and neighboring slave flight vehicles; and
      receiving, by the master flight vehicle and the slave flight vehicles, the pushing signals from the neighboring slave flight vehicles;
   computing, by the master flight vehicle, relative locations in the formation on a master-slave basis from a ranged pull-push relationship using TWR time information;
   computing, by the slave flight vehicles, relative locations in the formation on a slave-slave basis using a received signal strength indicator (RSSI) and time of arrival (ToA);
   generating a fingerprint map in a manner that varies with each formation, using all of the relative locations of the master flight vehicle and the slave flight vehicles in the formation; and
   computing the locations of the plurality of swarm flight vehicles using the generated fingerprint map.

2. The method of claim 1, wherein in the sending-out of the pulling signal, scheduling is performed on the slave flight vehicles by a routine and an order that correspond to each formation type, to allow the ranging to be performed on a swarm-type basis.

3. The method of claim 2, wherein the scheduling includes a sequence for the routine based on each formation type, to allow the ranging to be performed on the swarm-type basis.

4. The method of claim 3, wherein in the computing of the relative locations on the master-slave basis, directivity is provided to the relative locations using a variation of the RSSI, which results from a Doppler frequency deviation and is computed from the ranged pull-push relationship.

5. The method of claim 3, wherein in the generating of the fingerprint map, the relative locations are computed on the master-slave basis from a pre-registered wave map database (DB) for ranging on the basis of the RSSI in accordance with the pull-push relation based on each formation, and the fingerprint map is generated in an integrated manner on the basis of each formation.

\* \* \* \* \*